United States Patent Office 3,078,177
Patented Feb. 19, 1963

3,078,177
FLUIDIZED BED COATING PROCESS, ARTICLE, AND COMPOSITION
Paul D. Hann, Bartlesville, Okla., assignor to Phillips Petroleum Company, a corporation of Delaware
No Drawing. Filed Dec. 28, 1959, Ser. No. 862,030
15 Claims. (Cl. 117—21)

This invention relates to plastic coating. More specifically, the invention relates to improved processes for coating, an improved thermoplastic composition for use in the processes, and to articles having this coating thereon. Such plastic coatings are necessary for protecting the surfaces of articles which are exposed to destructive solvents, chemicals, or corrosive agents. The coatings are also used to provide electrical insulation.

The fluidized bed coating process is one which has received considerable acceptance for the application of uniform coatings of plastic materials to various articles. In such a coating process, the coating material in a finely divided condition is transformed into a continuously fluidized bed by introducing at least one current of gas under pressure therein. The article to be coated is at least partially immersed into the fluidized bed while the article is heated, for example, by heating the material before immersion.

Another coating process to which my invention is applicable is the "tumbling drum" process suitable for applying a coating to the insurfaces of tanks, pails, drums, and the like. In the process a mass of powdered thermoplastic material in excess of that needed for the desired coating is introduced into the preheated article. The article is then rotated and the thermoplastic material adjacent the surface of the article fuses and forms a protective surface.

These processes are particularly applicable to the production of coatings from high-melting high molecular weight organic polymeric thermoplastic resins such as polyethylene and polyamides, generally referred to as nylons. Other coating materials include polystyrenes, acrylic resins, bitumen such as gilsonite or asphalt, shellac, and wax. Mixtures of these materals can also be employed. In some operations, filler materials are added, such materials including, for example, powdered asbestos, slate, metal powders, and pigments.

The coating material should be finely divided, generally fine enough to pass a 50 mesh screen. The coating applied will be from 5 to 30 mils in a single operation and thicker coatings can be applied by repeating the operation.

Occasionally, a difficulty arises in the operation of such processes, this difficulty being uneven coating. The present invention provides a method by which it is possible to produce smoother and more resistant coatings.

Broadly, the present invention is based upon the discovery that the addition of a small quantity of a phosphatide will improve the coating process. The addition of such a material also acts as an antioxidant.

A simplified flow diagram of the method is as follows:

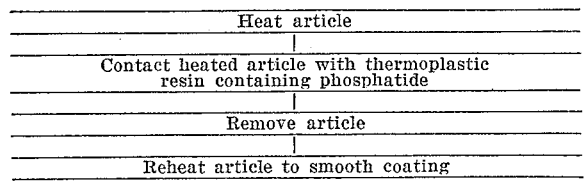

Therefore, the following are objects of my invention. An object of my invention is to provide an improvement for use in the thermoplastic material coating processes. A further object of my invention is to provide an improved composition for use in such coating processes, this composition comprising a thermoplastic resin and a phosphatide. A further object of my invention is to provide articles coated with this new composition.

Other objects and advantages of my invention will be apparent to one skilled in the art upon reading this disclosure.

As stated, my invention primarily resides in the use of a new composition in the coating processes, this composition comprising a thermoplastic resin such as set forth above and a phosphatide. Phosphatides are also designated as lecithin, lipids, or lipins. While these materials are usually obtained in the raw state in the treatment of soya beans, the phosphatides from other suitable raw materials such as egg yolk, lupins and other vegetable or animal material can be used. The phosphatide is used in an amount of 0.1 to 5, usually 0.5 to 1, weight percent based upon the weight of the resin.

The phosphatide can be added to the thermoplastic resin in a variety of methods. It can be incorporated in the resin by mixing in a suitable mixer or a concentrated mixture of the phosphatide and resin can be made which is subsequently added to an additional quantity of the thermoplastic resin. The phosphatide can also be added separately to the coating composition as a finely divided solid and the mixture used. A liquid phosphatide can also be used. When a pigment is used, the phosphatide can be added directly thereto.

The addition of phosphatides, particularly soya lecithin, not only produces a smoother coating but increases the resistance of the coating to various corrosive materials. My work has shown that the coating is more resistant to salt solutions and to acidic solutions.

A further advantage of the use of these materials is obtained in fluidized bed operation because movement of the article during coating is not necessary. This movement has been considered previously as an essential step.

The following examples illustrate specific embodiments of my invention.

*Example I*

High density polyethylene prepared according to the method of Hogan et al., 2,825,721, was used as the thermoplastic resin in the coating of steel strips.

Three pounds of this polyethylene was milled at 320° F. with 1 percent soya lecithin. The blend was then ground in a Mikro-Pulverizer to pass a 50-mesh screen. The resulting powder was tan in color and had a characteristic odor of lecithin. To serve as a control, 3 pounds of the same polyethylene were ground to pass the 50-mesh screen.

With these materials, 3 runs were made. The first run was with the polyethylene with no additive, the second with the polyethylene containing 1 percent lecithin, and the third with an equal weight mixture of the lecithin free and lecithin-containing material. This third run had, then, ½ percent lecithin in the total coating composition.

Steel strips 1 x 4 x 0.064 inches were shot blasted, rinsed with acetone, preheated to 450° F., dipped for ten seconds in the fluidized powder and reheated at 450° F. to smooth the coating. They were then dipped a second time in the fluidized powder and reheated at 450° F. until smooth. This took 6 to 12 minutes. The same cycle was used in all cases. This produced a coating about 15 mils thick that showed no pin holes when tested with a high voltage spark.

Duplicate coated coupons were half immersed in 10 percent sodium chloride solution at 160° F. for a period up to six weeks. Polyethylene alone failed after three weeks by cracking, loss of adhesion, and underfilm corrosion. The coating containing 1 percent lecithin was unchanged after six weeks while the coating with 0.5 percent lecithin had slight underfilm corrosion after six weeks.

Similar coupons were half immersed in 40 percent sulfuric acid at 160° F. for periods up to six weeks. Failures were distinct and rapid when the acid came in contact with the metal. Duplicates of polyethylene alone failed in five and six weeks. One of the coupons with 0.5 percent lecithin failed in five weeks while the other was unchanged in six weeks. Both coupons with the 1 percent lecithin coating were unchanged after six weeks.

*Example II*

This example illustrates the tumbling bed technique. An 18-gauge steel drum is preheated to 475° F. and horizontally rotated about its axis on suitable rollers. The polyethylene of Example I containing 1 percent lecithin is introduced. This produces a coating on the drum after which the excess coating composition can be poured out. A reheating to 400° F. for 12 minutes produces a smooth coating which is resistant to the acid and salt solutions of Example I.

As many possible embodiments can be made of this invention without departing from the scope thereof, it is to be understood that all matter herein set forth is to be interpreted as illustrative and not as unduly limiting the invention.

I claim:

1. In the coating of articles with a high-melting, high molecular weight organic polymeric thermoplastic resin by the fluidized bed coating or tumbling drum techniques, the improvement comprising having present in said resin a small amount of a phosphatide during the coating operation.

2. In the coating of articles with a high-melting, high molecular weight organic polymeric thermoplastic resin by the fluidized bed coating or tumbling drum techniques, the improvement comprising having present in said resin a small amount of lecithin during the coating operation.

3. In the coating of metal articles by the fluidized bed coating technique wherein a dense phase of polyethylene particles is maintained and into which the preheated article to be coated is dipped, the improvement comprising premixing a small amount of a phosphatide with the polyethylene and using the mixture in the coating operation.

4. In the coating of metal articles by the fluidized bed coating technique wherein a dense phase of polyethylene particles is maintained and into which the preheated article to be coated is dipped, the improvement comprising premixing 0.1 to 5 percent by weight of lecithin with the polyethylene and using the mixture in the coating operation.

5. In the coating of metal articles by the fluidized bed coating technique wherein a dense phase of polyethylene particles is maintained and into which the preheated article to be coated is dipped, the improvement comprising premixing 0.5 to 1.0 percent by weight of lecithin with the polyethylene and using the mixture in the coating operation.

6. In the coating of metal articles by the tumbling drum coating technique wherein a mass of polyethylene particles in excess of that needed for the desired coating is tumbled in a preheated rotating drum and wherein polyethylene adjacent the metal surface is fused, the improvement comprising premixing a small amount of a phosphatide with the polyethylene and using the mixture in the coating operation.

7. In the coating of metal articles by the tumbling drum coating technique wherein a mass of polyethylene particles in excess of that needed for the desired coating is tumbled in a preheated rotating drum and wherein polyethylene adjacent the metal surface is fused, the improvement comprising premixing 0.1 to 5 percent by weight of lecithin with the polyethylene and using the mixture in the coating operation.

8. In the coating of metal articles by the tumbling drum coating technique wherein a mass of polyethylene particles in excess of that needed for the desired coating is tumbled in a preheated rotating drum and wherein polyethylene adjacent the metal surface is fused, the improvement comprising premixing 0.5 to 1.0 percent by weight of lecithin with the polyethylene and using the mixture in the coating operation.

9. An article having a polyethylene coating, said polyethylene coating containing a small amount of a phosphatide.

10. An article having a polyethylene coating, said polyethylene coating containing 0.1 to 5 percent by weight of lecithin.

11. An article having a polyethylene coating, said polyethylene coating containing 0.5 to 1.0 percent by weight of lecithin.

12. Polyethylene containing a small amount of a phosphatide.

13. Polyethylene containing a small amount of a lecithin.

14. Polyethylene containing 0.1 to 5 percent by weight of lecithin.

15. Polyethylene containing 0.5 to 1.0 percent by weight of lecithin.

References Cited in the file of this patent

UNITED STATES PATENTS

| | | |
|---|---|---|
| 2,295,179 | Loane | Sept. 8, 1942 |
| 2,480,296 | Burk | Aug. 30, 1949 |
| 2,737,461 | Heisler et al. | Mar. 6, 1956 |
| 2,844,489 | Gemmer | July 22, 1958 |
| 2,955,958 | Brown | Oct. 11, 1960 |

FOREIGN PATENTS

| | | |
|---|---|---|
| 566,048 | Great Britain | Dec. 11, 1944 |
| 571,783 | Great Britain | Sept. 10, 1945 |